United States Patent [19]

Andersson et al.

[11] Patent Number: 5,675,376
[45] Date of Patent: Oct. 7, 1997

[54] METHOD FOR ACHIEVING EYE-TO-EYE CONTACT IN A VIDEO-CONFERENCING SYSTEM

[75] Inventors: Russell Lennart Andersson, Manalapan, N.J.; Homer H. Chen, Thousand Oaks, Calif.

[73] Assignee: Lucent Technologies Inc., Murray Hill, N.J.

[21] Appl. No.: 575,972

[22] Filed: Dec. 21, 1995

[51] Int. Cl.⁶ .............................. H04M 11/00; H04N 7/14
[52] U.S. Cl. .................................. 348/20; 348/15
[58] Field of Search ................ 348/14–20; 379/96, 379/202, 203, 204, 205, 206; 382/117, 118; H04N 7/14, 7/12

[56] References Cited

U.S. PATENT DOCUMENTS

| 5,438,357 | 8/1995 | McNelley | 348/15 |
| 5,500,671 | 3/1996 | Andersson et al. | 348/15 |

*Primary Examiner*—Wing F. Chan

[57] ABSTRACT

Methods for achieving eye-to-eye contact in a video-conferencing system use a controller to calculate eye contours, radius profiles, and positions from images stored in memory. Once the contours and radius profiles are generated, an eye image can be "shifted" to achieve eye-to-eye contact.

26 Claims, 3 Drawing Sheets

METHOD FOR ACHIEVING EYE-TO-EYE CONTACT IN A VIDEO-CONFERENCING SYSTEM

BACKGROUND OF THE INVENTION

1. Field of the Invention

The present invention relates to a method for achieving eye-to-eye contact in a real-time, video conferencing system.

2. Description of Related Art

Desktop video conferencing typically requires the use of a camera and a monitor. The camera is used to transmit pictures to a remote location while the monitor is used to enable a viewer to see pictures, e.g. of remote participants in a conference, at a remote location. The camera is usually mounted on the perimeter of the monitor so it does not block the view of a person wishing to look at the monitor. In present video conferencing systems, participants in a conference must watch the monitor and are unable to look directly at the camera. Said another way, the participants cannot look at the monitor and at the camera at the same time. Because of this, images of the participants which are transmitted to a remote monitor make it appear as if the participants are gazing off into space, rather than looking directly at the remote participants. This effect is true for both sets of participants. As a result the participants can see each other but cannot achieve eye-to-eye contact with one another. This is a significant drawback which limits the usefulness of today's desktop video conferencing equipment in providing natural conversation.

Attempts to solve this problem have been proposed. One solution employs an electronic shutter and a half-reflecting mirror to make the camera physically or effectively point at a participant. This approach, though effective, is expensive. In addition, placing half-reflecting mirrors or other bulky accessories around a monitor or terminal is often inconvenient in true desktop applications.

SUMMARY OF THE INVENTION

It is therefore an object of the present invention to provide a method for enabling eye-to-eye contact in desktop video conferences.

It is a further object of the present invention to provide a method for achieving eye-to-eye contact in a video-conferencing system comprising: controlling pixels in memory, each pixel representing part of an image comprising human eye positions and each having a corresponding intensity level to achieve eye-to-eye contact, said controlling comprising; first detecting the positions of each iris of each eye, said first detecting comprising instructing a controller to complete a spiral search of pixels stored in memory for each iris, categorizing the pixels searched, by intensity, as at least iris, near-iris or non-iris, calculating an initial pixel from said iris intensities, instructing the controller to first scan the pixels in memory, including the categorized pixels, for each iris starting from the initial pixel of each iris until the controller locates pixels having intensity levels exceeding a first threshold over an average iris intensity level, the first scan comprising scanning a number of video lines of the image, further instructing the controller to halt said first scanning when said controller detects non-iris pixels, wherein an iris boundary for each iris is determined from said non-iris pixels, calculating a center for each iris from the iris boundary and repeating said first detecting for each position of each iris, second detecting the positions of each eyelid that covers each eye, said second detecting comprising instructing the controller to additionally scan pixels outside of the iris boundary of each eye in first directions, detecting pixel intensities corresponding to post-lid pixels, retracing said additional scanning in directions opposite to said first directions, detecting pixel intensities corresponding to last white pixels, said last white pixels indicating the beginning of each eyelid, instructing said controller to connect the last white pixels to generate a contour of each eye, and repeating said second detecting for each position of each eyelid, and shifting positions of pixels stored in memory using the controller within each eyelid boundary of each eye to achieve eye-to-eye contact, and repeating said shifting for each position of each eye.

It is still another object of the present invention to provide a method for achieving eye-to-eye contact in a video conferencing system comprising: controlling pixels in memory, each pixel representing part of an image comprising human eye positions and each having a corresponding intensity level, to achieve eye-to-eye contact, said controlling comprising; instructing a controller to first scan pixels in memory and to determine an iris boundary and a center of each iris, for each position of each eye and repeating said first scan for each position of each iris, instructing the controller to additionally scan pixels outside of the iris boundary of each eye and to generate a contour of each eye for each eye position from said additional scan, and repeating said additional scan for each position of each eye, and shifting positions of pixels using the controller within each eyelid boundary of each eye to achieve eye-to-eye contact, and repeating said shifting for each position of each eye.

DETAILED DESCRIPTION OF THE PREFERRED EMBODIMENTS

Figure 1:
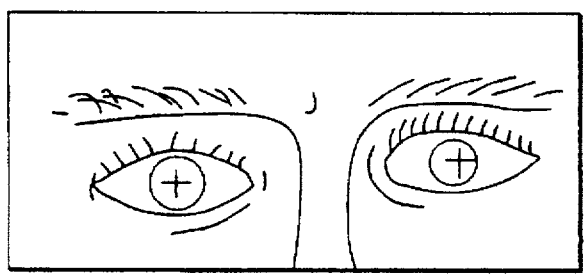
FIG. 1 shows an image where the boundaries of a human iris have been detected and a seed position has been located according to one embodiment of the present invention.

Referring to FIG. 1, an image of two human eyes with their iris boundaries having been detected and indicated by dotted white lines on the perimeter of each iris is depicted. An embodiment of the present invention for detecting these boundaries is as follows.

Figure 3:
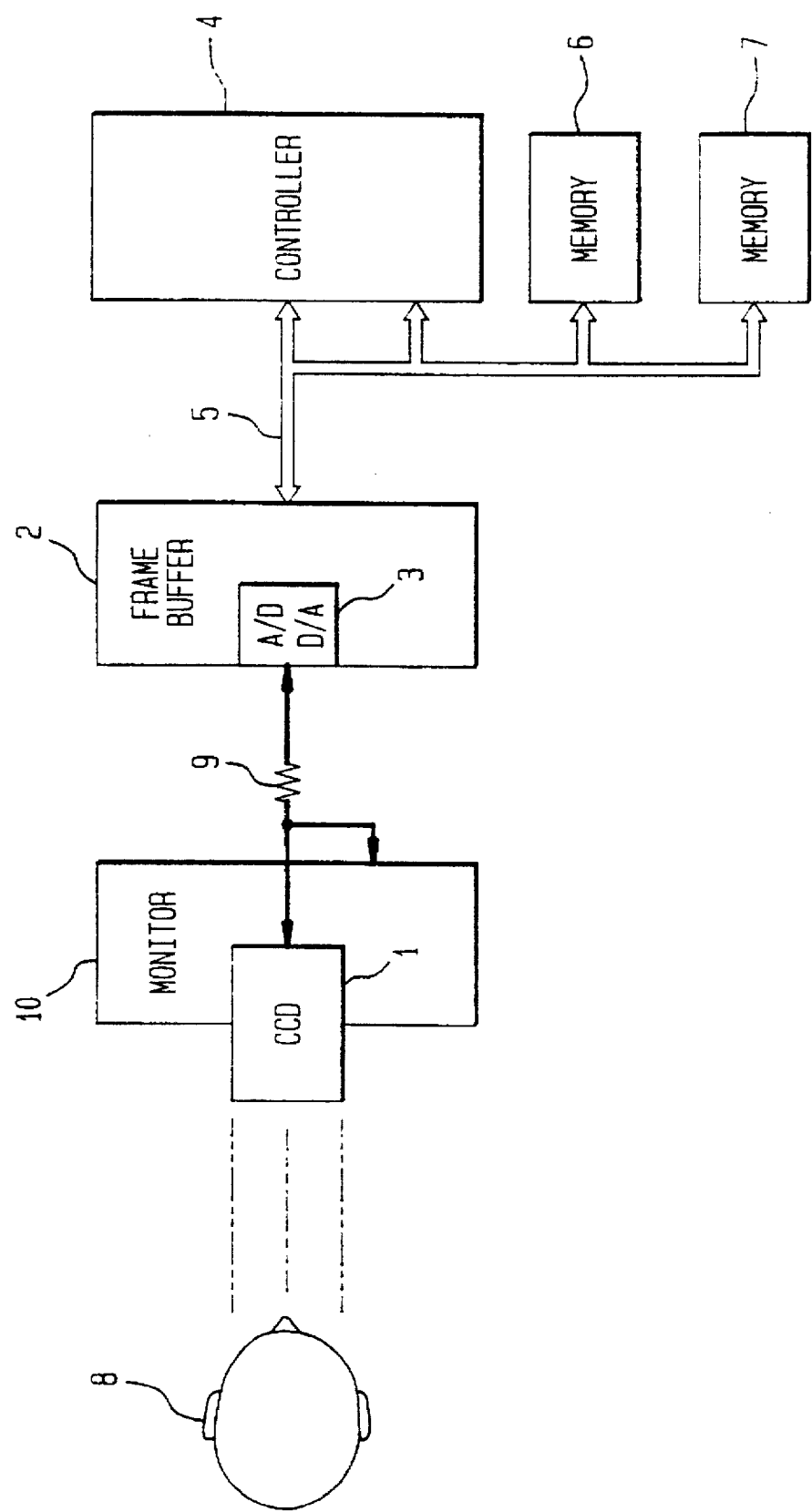
FIG. 3 shows a block diagram of an apparatus used to carry out methods according to embodiments of the present invention.

Referring now to FIG. 3, images representing human eye positions of a participant 8 are detected by a camera or detector 1. Analog image information representing these images is then transmitted via communications medium 9 to a frame buffer or memory 2 which may include an analog-to-digital (and digital-to-analog) converter 3 for converting the analog image information into digital image information (in one direction) comprising multiple frames of image information. Each frame is itself composed of a number of video lines. The digital image information is then stored in frame buffer 2. The digital image information is organized into pixels in the frame buffer 2. A controller 4 then fetches electronic signals representing instructions from a program memory 6 via bus 5. These instructions direct the controller 4 to query the frame buffer 2 via bus 5. In querying the frame buffer 2 the controller 4 conducts a "spiral-like" search of pixels outward from a pixel in a frame of the frame buffer 2, which represents a position of an iris of a human eye in a previous frame, looking for several nearby dark pixels.

The pixels searched are categorized by intensity into at least three categories, iris, near-iris or non-iris by comparing each pixel intensity to a previously determined and later adjusted, reference level or average iris intensity level. The controller then calculates an initial or seed pixel for each iris from these categorized intensities. Once an initial pixel is determined the controller 4 conducts a first, two-dimensional scan of the pixels in each video line of each frame of the frame buffer 2, including the categorized pixels, starting from the initial pixel until the controller 4 locates pixels having intensity levels exceeding a first threshold over the reference level. It should be noted that the first scan actually comprises a number of scans, one each for each video line.

The controller 4 halts each scan of the two-dimensional scan when the controller detects the absence of pixels corresponding to each iris, i.e., non-iris pixels or pixels adjacent to the edge of the iris.

An iris boundary for each iris can then be determined from the non-iris pixels. Thereafter, the center for each iris is calculated by the controller 4 using the iris boundary. The above steps can be repeated for each video line of each frame of the frame buffer 2 to determine an iris boundary for each position of the iris of each eye.

The eyelid for each eye may be detected using the calculated iris boundaries according to an embodiment of the invention described below.

The controller 4 again queries each frame of the frame buffer 2 and completes an additional scan of pixels outside of the calculated iris boundary of each iris in first directions. The controller 4 then determines or detects the intensities of pixels which correspond to post-lid pixels. The positions of these post-lid pixels are stored in an additional memory 7.

The controller 4 then retraces the additional scanning in directions opposite to the first directions in order to detect pixel intensities which correspond to last white pixels of each eye.

The last white pixels of each eye indicate the beginning of each eyelid.

In this manner an eyelid boundary for each eye may be determined at the edge of the last white pixels. The first directions may be scanning left from pixels representing the left edge of the iris boundary and right from the right edge of the iris boundary to the edge of the white pixels or they may be a scan from pixels representing the center of the iris up to the eyelid and down (from the center) to the eyelid. In this manner an eyelid boundary is detected.

The controller 4 may then be instructed, using instructions from program memory 6, to connect the last white pixels in order to generate a contour for each eye. The controller completes the additional scanning and generates contours for the position of each eye contained in frames of the frame buffer 2.

Once the iris boundary and eyelid boundary for each eye have been detected, the position of each eye may be shifted to achieve eye-to-eye contact according to embodiments of the invention described below.

In one embodiment, the controller 4 electronically shifts the position of pixels or video lines stored in each frame of the frame buffer 2 which are located within each eyelid boundary from initial positions to shifted positions by a shift amount which is determined by camera-display geometry data stored in memory 7. The controller 4 also adjusts the intensity levels of shifted pixels to eliminate any artificial image boundaries.

In another embodiment, completely new eye pixels are synthesized. An iris radius is determined from the iris boundary, and is then used to generate "artificial" or "synthetic" pixels for an iris of the same size, using a stored radial profile. The synthetic eye is generated at the measured location, shifted by the camera-display geometry.

The stored radial profile is determined initially from either a generic eye, or the particular participant's eye.

Figure 2A:
FIG. 2(a) shows an image as it is typically displayed on a monitor of a prior art desktop video conferencing system where no eye-to-eye contact is made between participants in a conference.
Figure 2B:
FIG. 2(b) shows an image as displayed on the monitor of a desktop video conferencing system according to one embodiment of the present invention where the image of FIG. 2(a) has been altered to provide eye-to-eye contact between participants in a conference.

FIGS. 2A and 2B depict an example of human eyes both before (FIG. 2A) and after (FIG. 2B) shifting.

During the detection of the iris boundary of each eye the controller 4 automatically computes the average iris intensity level, or reference level, corresponding to each iris from pixels near the iris boundary. In addition, the controller 4 utilizes stored spatial consistency constraints from memory 7 to determine whether to halt the first scan. More specifically, during the first scan, the controller scans one video line at a time. As it does so, the controller keeps track of the number of pixels in each video line, i.e. scan. If in any given scan the number of pixels in a subsequent or second video line greatly exceeds the number of pixels in a previous first video line the controller halts the scan.

Optionally, the additional scanning of pixels outside of each iris boundary in first directions may further comprise steps such as detecting initial iris white intensities, detecting changes in intensity which correspond to pixels of each eyelid and further detecting increased intensities of pixels corresponding to post-lid pixels once the additional scanning by the controller 4 has crossed eyelid pixels in a frame.

During the shifting of pixels (including synthesized pixels) within an eyelid boundary an amount that one pixel is shifted in one eye may differ from the amount that a pixel is shifted within the iris boundary of the other eye, depending on the camera-display geometry data stored in memory 7. In addition, intensity levels of shifted pixels may be adjusted with reference to neighboring white iris pixels.

When the camera 1 is mounted on the side of a monitor 10, eyes need only be shifted horizontally. If the camera 1 is placed on top of the monitor, additional processing is required to "lift" the eyelids. This additional processing may comprise shifting the position of pixels stored in each frame of the frame buffer 2 in both horizontal and vertical directions. In addition, eyelid pixels which are outside of each eyelid boundary must also be shifted.

Once a frame has been modified (i.e. shifted) by the controller 4, it is displayed so it can be viewed by a remote conference participant.

Figure 4A:
FIGS. 4A–C show block diagrams of systems used to carry out methods according to embodiments of the present invention.
Figure 4B:
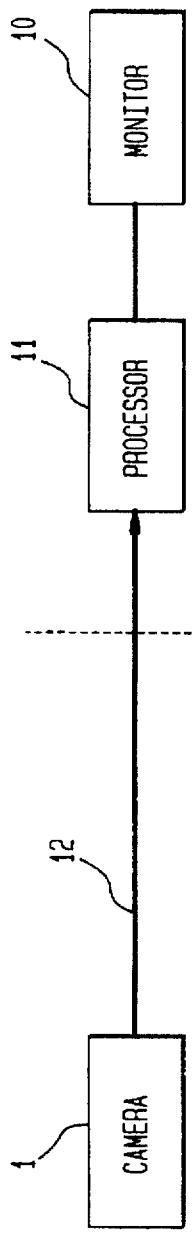
Figure 4C:
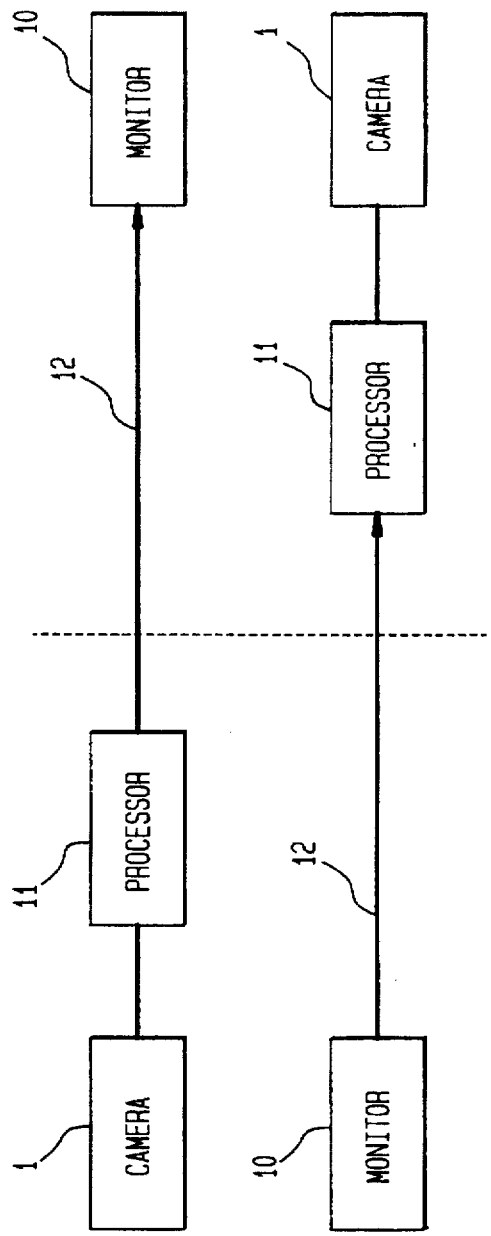

Often participants will be separated by a substantial distance, necessitating a complex transmission method, such as video compression and decompression. As shown in FIG. 4A, a long link 12 may conveniently be situated between the image processor 11 (composed of frame buffer 2, controller 4, bus 5, program memory 6, and memory 7, from FIG. 3)

and monitor 10 for best image quality. Alternatively, as shown in FIG. 4B, the link 12 may be situated between the camera 1 and the image processor 11. The set-up shown in FIGS. 4A or 4B can be used unidirectionally as shown, say for television broadcast applications, or typically, combined back to back so both participants #1 and #2 may see images with satisfactory eye contact. FIG. 4C shows a symmetric, back to back near-end configuration. FIGS. 4A and 4B can be combined to give three distinct back-to-back configurations.

The above-described embodiments are but some examples of the novel methods which may be used in a video conferencing system to achieve eye-to-eye contact between participants. Modifications to the above-described preferred embodiments may occur to those skilled in the art without departing from the spirit and scope of the present invention as defined in the appended claims.

What is claimed is:

1. A method for achieving eye-to-eye contact in a video-conferencing system comprising:

controlling pixels in memory, each pixel representing part of an image comprising human eye positions and each having a corresponding intensity level, to achieve eye-to-eye contact, said controlling comprising, (1) first detecting the positions of each iris of each eye, said first detecting comprising instructing a controller to complete a spiral search of pixels stored in memory for each iris, categorizing the pixels searched, by intensity, as at least iris, near-iris or non-iris, calculating an initial pixel from said categorized iris intensities, instructing the controller to first scan the pixels in memory, including the categorized pixels, for each iris starting from the initial pixel of each iris until the controller locates pixels having intensity levels exceeding a first threshold over an average iris intensity level, the first scan comprising scanning a number of video lines of the image, further instructing the controller to halt said first scanning when said controller detects non-iris pixels, wherein an iris boundary for each iris is determined from said non-iris pixels, calculating a center for each iris from the iris boundary, and repeating said first detecting for each position of each iris, (2) second detecting the positions of each eyelid that covers each eye, said second detecting comprising instructing the controller to additionally scan pixels outside of the iris boundary of each eye in first directions, detecting pixel intensities corresponding to post-lid pixels, retracing said additional scanning in directions opposite to said first directions, detecting pixel intensities corresponding to last white pixels, said last white pixels indicating the beginning of each eyelid, instructing said controller to connect the last white pixels to generate a contour of each eye, and repeating said second detecting for each position of each eyelid, and (3) shifting positions of pixels stored in memory using the controller within each eyelid boundary of each eye to achieve eye-to-eye contact, and repeating said shifting for each position of each eye.

2. The method as in claim 1 wherein said shifting comprises shifting said stored pixels from initial positions to shifted positions by a shifted amount corresponding to a camera-display geometry, and adjusting intensity levels of shifted pixels shifted to the initial positions to eliminate artificial image boundaries.

3. The method as in claim 1 wherein said first detecting further comprises automatically adjusting the average iris intensity level.

4. The method as in claim 1 wherein the controller halts said first scan when the number of pixels in a first video line greatly exceeds the number of pixels in a second video line of the image.

5. The method as in claim 1 wherein said additional scanning of said pixels outside of the iris boundary of each eye in first directions further comprises detecting initial iris white intensities, detecting changes in intensity corresponding to pixels of each eyelid and further detecting increased intensities of the pixels corresponding to post-lid pixels once said additional scanning has crossed each eyelid.

6. The method as in claim 2 wherein a shifted amount of a pixel within an eyelid boundary of one eye differs from a shifted amount of a pixel within the eyelid boundary of the other eye depending on the camera-display geometry.

7. The method as in claim 2 wherein the intensity levels of the shifted pixels are adjusted with reference to neighboring white and iris pixels.

8. The method as in claim 2 wherein shifting positions of pixels within each eyelid boundary comprises shifting the position of pixels in horizontal directions.

9. The method as in claim 2 wherein shifting the positions of pixels within each eyelid boundary comprises shifting the position of pixels in both horizontal and vertical directions.

10. The method as in claim 1 further comprising:
    detecting eyelid pixels; and
    shifting positions of pixels corresponding to each eyelid for each position of each eye.

11. The method as in claim 1 further comprising detecting the image.

12. The method as in claim 1 further comprising storing the image pixels in memory.

13. The method as in claim 1 wherein said shifting comprises shifting synthesized pixels stored in memory.

14. A method for achieving eye-to-eye contact in a video-conferencing system comprising:

controlling pixels in memory, each pixel representing part of an image comprising human eye positions and each having a corresponding intensity level, to achieve eye-to-eye contact, said controlling comprising, (1) instructing a controller to first scan pixels in memory and to determine an iris boundary and a center of each iris, for each position of each eye and repeating said first scan for each position of each iris, (2) instructing the controller to additionally scan pixels outside of the iris boundary of each eye and to generate a contour of each eye for each eye position from said additional scan and repeating said additional scan for each position of each eye, and (3) shifting positions of pixels using the controller within each eyelid boundary of each eye to achieve eye-to-eye contact, and repeating said shifting for each position of each eye.

15. The method as in claim 14 wherein said shifting comprises shifting said stored pixels from initial positions by a shifted amount corresponding to a camera-display geometry and adjusting intensity levels of shifted pixels shifted to the initial positions to eliminate artificial image boundaries.

16. The method as in claim 14 further comprising detecting the image.

17. The method as in claim 14 further comprising storing the image as pixels in memory.

18. The method as in claim 14 wherein each of said iris boundaries is determined using non-iris pixels.

19. The method as in claim 18 wherein said non-iris pixels are detected by instructing the controller to complete a spiral search of pixels stored in the memory for each iris position and by categorizing the pixels searched by intensity as at least iris, near-iris or non-iris.

20. The method as in claim 19 comprising calculating an initial pixel for each iris from said categorized iris intensities.

21. The method as in claim 20 wherein said first scan comprises scanning the pixels in memory, including the categorized pixels, for each iris starting from the initial pixel until the controller locates pixels having intensity levels exceeding a first threshold over an average iris intensity level the first scan comprising scanning a number of video lines of the image.

22. The method as in claim 14 wherein the controller is instructed to halt said first scan when the controller detects non-iris pixels.

23. The method as in claim 22 wherein the first scan is halted when the number of pixels in a first video line greatly exceeds the number of pixels in a second video line of the image.

24. The method as in claim 14 wherein said shifting comprises shifting synthesized pixels stored in memory.

25. The method as in claim 14 wherein said shifting of pixels within each eyelid boundary comprises shifting the position of pixels in horizontal directions.

26. The method as in claim 14 wherein said shifting of pixels within each eyelid boundary comprises shifting the position of pixels in both horizontal and vertical directions.

* * * * *